United States Patent [19]

Fullemann

[11] Patent Number: 4,686,940
[45] Date of Patent: Aug. 18, 1987

[54] DEVICE FOR HEATING A FLUID AND FOR CLEANING WASTE GASES FROM HEATING SYSTEMS

[75] Inventor: Jorg Fullemann, Mastrils, Switzerland

[73] Assignee: VTH AG, Liechtenstein

[21] Appl. No.: 752,762

[22] Filed: Jul. 8, 1985

[30] Foreign Application Priority Data

Jul. 9, 1984 [CH] Switzerland ............... 3309/84

[51] Int. Cl.⁴ ............................................... F22B 1/02
[52] U.S. Cl. .................................. 122/31 R; 110/215;
   122/5.5 A; 122/13 R; 122/23; 122/367 PF
[58] Field of Search ............... 122/5, 5.5 A, 13 R,
   122/28, 31 R, 33, 155 R, 155 F, 158, 166 R, 168,
   169, 249, 367 PF; 110/215, 233, 234; 126/344,
   360 R, 361

[56] References Cited

U.S. PATENT DOCUMENTS

| | | | |
|---|---|---|---|
| 2,399,871 | 5/1946 | Johansson | 122/5.5 A |
| 2,683,442 | 7/1954 | Karlen | 122/33 |
| 4,461,223 | 7/1984 | Masaki | 110/215 |
| 4,520,761 | 6/1985 | Arnold | 110/215 X |
| 4,530,347 | 7/1985 | Baker et al. | 110/215 X |
| 4,555,993 | 12/1985 | Gallaro | 122/28 X |

FOREIGN PATENT DOCUMENTS

| | | |
|---|---|---|
| 56994 | 8/1912 | Austria . |
| 306216 | 3/1973 | Austria . |
| 3122026 | 1/1983 | Fed. Rep. of Germany . |

Primary Examiner—Albert J. Makay
Assistant Examiner—Steven E. Warner
Attorney, Agent, or Firm—Griffin, Branigan & Butler

[57] ABSTRACT

A device 10 for both heating a fluid and for cleaning a waste gas comprises a container 14 into which waste gas is introduced through a waste gas inlet. The waste gas is moved through the container 14 by a fan 25. The blades 35 of fan 25 are also used to atomize a liquid directed thereto and to spray the liquid into the waste gas in the container 14. In addition, fan 25 facilitates the recirculation of at least a portion of the waste gas in the container 14 back through the fan 25 for repeated introduction of the waste gas into the container 14. A heat exchanger 11 is disposed in container 14 for transferring heat between the waste gas in the chamber and a liquid-to-be-heated. In a preferred embodiment, an insulated funnel 17 comprises an inlet for the waste gas. Means are provided for introducing liquid tangentially into the funnel 17 for forming a liquid layer to cover and inner surface of the funnel 17, whereby the liquid layer precludes direct contact of the waste gas with the inner surface of the waste gas inlet.

11 Claims, 3 Drawing Figures

DEVICE FOR HEATING A FLUID AND FOR CLEANING WASTE GASES FROM HEATING SYSTEMS

BACKGROUND OF THE INVENTION

I. Field of the Invention

This invention concerns a device for heating a fluid and for cleaning waste gases from heating systems.

II. Prior Art and Other Considerations

Over the years different methods for cleaning combustion waste gases have been employed in conjunction with power plants, incinerators, and the like. Whereas in connection with industrial heating measures are taken to keep the air clean, such measures are not practical for residential heating systems used for room heating and hot-water heating. Accordingly, room heating and hot-water peparation contributes a substantial share to the general problem of air pollution. The problem of air pollution has been recognized for years, but only recently have efforts been made to provide for small heating systems devices suitable for cleaning the waste gases produced by those systems. It is now realized that substantial problems are involved in building reliable and economical waste gas-cleaning devices which are suitable for relatively small heating systems. As an example, wet cleaning systems of relatively small dimensions tend to clog, thereby posing a considerable problem.

German published application No. 31 22 026 discloses a wet cleaning system for particulate-laden gases. The disclosed system cleans waste gases with only a small expenditure of energy, thereby fulfilling industrial requirements and satisfying environmental concerns. To prevent clogging, in the disclosed system the cleaning fluid (normally water) is sprayed without the use of spray nozzles. Rather, a pump having a lifting tube is provided to pump water from a reservoir. The top of the lifting tube ends at a round disk and is provided with output openings. Through these openings the cleaning fluid is moved radially outwardly underneath the disk and is propelled by the disk with such a velocity that very fine fluid droplets are formed. In a separate compartment above the pump is a radial fan driven by the same motor as the pump. The radial fan moves the waste gas through the cleaning device. A centrifugal separator enclosing the fan is located on the drive shaft but is not connected thereto. The separator is set into rotation by the gas flow caused by the fan. This causes suction to be applied to the particles contained in the waste gas, so that these particles are moved downwardly. The waste gas, however, exits from the centrifugal separator in the upward direction.

The above-described cleaning device has a relatively small separation effect for harmful substances in gaseous form, such as sulfur dioxide. Moreover, the prior art device also does not provide for heat recuperation.

In the view of the foregoing, it is an object of the present invention to provide a highly reliable and efficient device for heating a fluid and for cleaning waste gases.

SUMMARY

A device for both heating a fluid and for cleaning a waste gas comprises a container into which waste gas is introduced through a waste gas inlet. The waste gas is moved through the container by a fan. The blades of fan are also used to atomize a liquid directed thereto and to spray the liquid into the waste gas in the container. In addition, the fan facilitates the recirculation of at least a portion of the waste gas in the container back through the fan for repeated introduction of the waste gas into the container. A heat exchanger is disposed in a container for transferring heat between the waste gas in the chamber and a liquid-to-be-heated.

Because the fan not only serves to feed the waste gases through the cleaning device, but also causes repeated circulation of a large part thereof in the container filled with water mist, a relatively long time is provided for heat exchange and for stripping noxious gases from the waste gas. Accordingly, this recirculation increases the heat recuperation and the efficiency of cleaning.

The fan also serves as means for spraying a liquid into the container. Conventional devices for spraying, for example devices in which a liquid passes through openings at the bottom, have the disadvantage that they are subject to clogging and generate relatively large drops. However, heat transfer and cleaning action are enhanced when very small drops are generated. Accordingly, it is preferable to generate a mist of very small droplets. Thus, in accordance with the present invention, water is fed to a fast rotating fan which generates a very fine distribution causing a water mist. Preferably the fan is surrounded by a tubular guide which causes a further disintegration of the water droplets. In addition, the guide has an effect of increasing the feed pressure. To obtain a particularly advantageous feed pressure the guide can be located eccentrically. Preferably the guide has a plurality of openings so that a part of the water droplets can fly through the openings into the space between the guide and the walls of the spray chamber. A further disintegration of the water droplets takes place by the impact and by disruption of a water film at the edges of the openings under the influence of the waste gases accelerated by the fan.

In various embodiments the tubular guide is axially movable with respect to the fan. The axially movable tubular guide permits a selective change in the amount of recirculation of the waste gas. A flue duct leads to the inlet of the fan. To adjust the amount of recirculation a valve is provided.

In a preferred embodiment the waste gas inlet is provided with flushing means to cover the inner surface of the waste gas inlet with a liquid layer. The liquid layer prevents the waste gas inlet from reaching a high temperature at which deposits from the spray water are formed on the inlet. Such deposits interfere with safe operation and are undesirable. In the preferred embodiment the waste gas inlet is located above the fan, making possible the feed of both water and waste gas to the fan. More particularly, the waste gas inlet comprises a funnel located essentially coaxially with the fan. The funnel has heat insulation on its outer surface and has an insulated tangential liquid inlet. A water layer is formed on the inner surface of the funnel, thereby protecting the funnel against undesired deposits of materials capable of clogging the inlet.

Embodiments of the invention provide for at least one thin film device, for example a layer of stones wetted by the liquid. In such embodiments the waste gas flows through the thin film device. The water causes a thin water film on the stones which quicly takes up heat and which is evaporated at least partially. Not only is there substantial heat transfer at the thin film device, but also a stripping of noxious substances from the waste gas takes place. This stripping is particularly effective when the waste gas mixes with evaporated water. In the stone layer there is a high turbulence which facilitates stripping. A particular advantage of the stone layer is its muffling action. This substantially limits the normal combustion noise. The muffling action is caused by the labyrinth passages between the stones and the sudden drop in pressure caused by the cooling of the gas. A layer of stones is but one example of an advantageous heat-proof and water-proof thin film device. Stones, in particular limestones, are cheap and serve in addition as neutralizing agents. Other means can be used to form thin liquid films, such as ceramic plates with a plurality of openings, a tube in which waste gas and wate flow in opposite directions, etc. After leaving the thin film device the waste gas has a substantially smaller volume than before and also a relatively low speed for facilitating the heat exchange.

In one embodiment the fan is located in a spray chamber and is at least partially enclosed by thin film means. When the spray chamber is enclosed by the thin film means, and when there is an intermediate space between the wall of the spray chamber and the inner wall of the container, the waste gas can, prior to its exit from the container, flow through this intermediate space. Preferably, the heat exchanger extends into this intermediate space to permit a condensation of water before the waste gas exits from the container. The lower part of the container serves as a water reservoir, there being in this water reservoir a portion of the heat exchanger to transmit the heat contained in the water to the fluid-to-be-heated. This heat exchanger is preferably a tube provided with ribs and wound helically.

In one embodiment a burner is located in the container. In this embodiment the cleaning device also serves as a boiler. A characteristic of this embodiment is that a large part of the heat is not transferred through the walls of the boiler, but by direct contact with the spray mist in the container. In this case a further transfer takes place through the heat exchanger to the fluid-to-be-heated.

A pump is provided for supplying sprayable liquid to the fan. The pump draws liquid from a reservoir. In one embodiment the pump rservoir is in the flue duct through which the waste gas is introduced. In another embodiment the pump reservoir is located in the burner chamber. In both embodiments a coaxial relationship exists between the container, heat exchanger, spray chamber, fan, pump, and burner.

The cleaning device thus has a concentric construction which facilitates manufacturing and provides for an inexpensive device.

In various embodiments a liquid drain valve for the fluid contained in the container is provided. A liquid level sensor and/or a pH sensor actuates the valve when a predetemined level and/or a predetermined pH value is sensed, thereby discharging excessive fluid from the fluid container. A metering device responsively connected to the pH sensor is capable of feeding a neutralizing agent into the fluid in the container.

BRIEF DESCRIPTION OF THE DRAWINGS

The foregoing and other objects, features, and advantages will be apparent from the following more particular description of a preferred embodiment of the invention, as illustrated in the accompanying drawings in which like reference characters refer to the same parts through out the different views. The drawings are not necessarily to scale, emphasis instead being placed on illustrating principles of the invention in a clear manner.

FIG. 1 is a cross-sectional view showing a cleaning device according to an embodiment of the invention wherein the device is connectable to a boiler or the like;

DETAILED DESCRIPTION OF THE DRAWINGS

Figure 1:
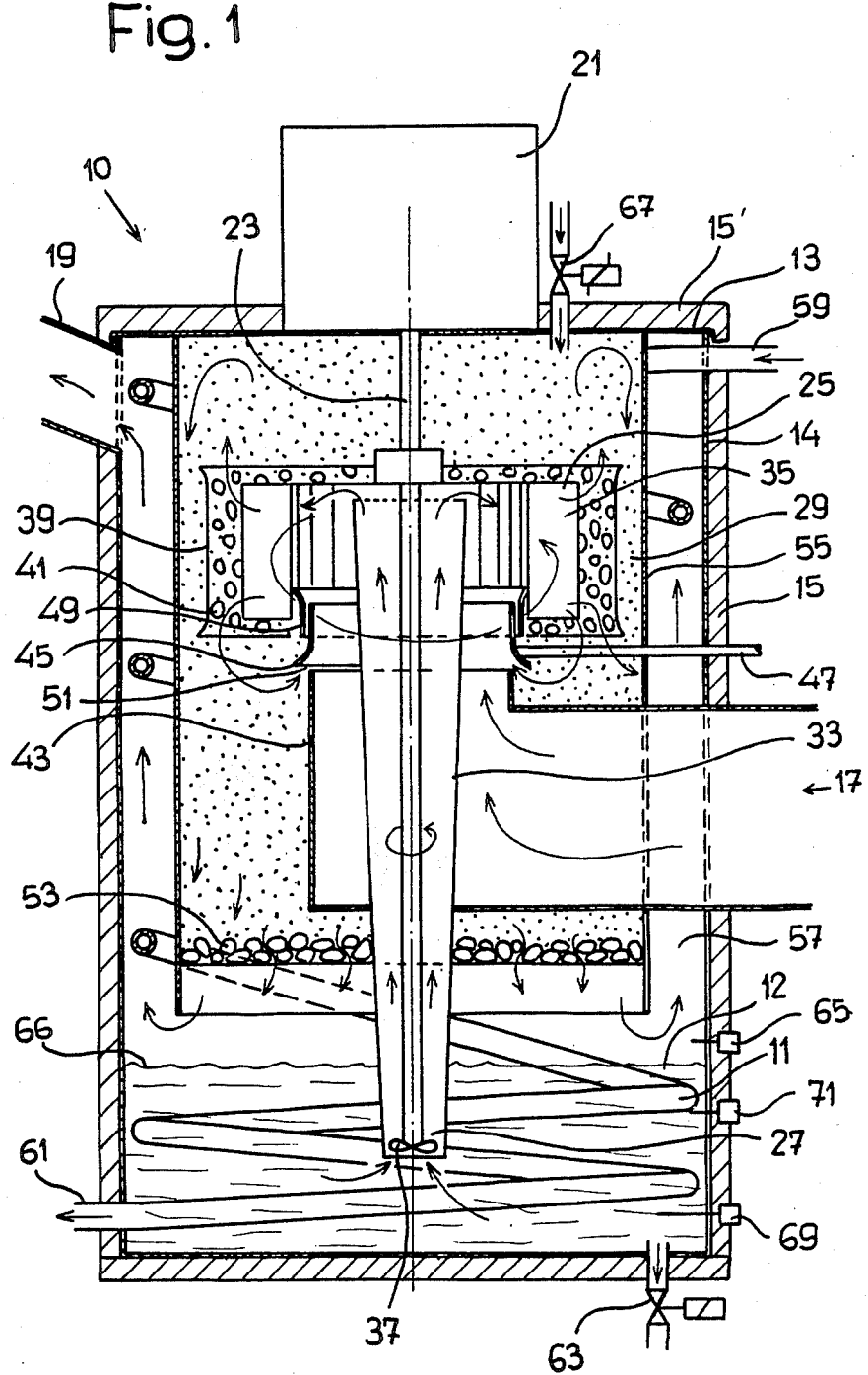

In the device 10 shown by FIG. 1 the heat contained in the waste gas of a heating system is transferred into water 12 and then, by means of a heat exchanger 11, is further transferred from the water to a fluid-to-be-heated. The device 10 comprises a lid 13 which covers a container 14. The helical heat exhanger 11 is housed in closed container 14. The container 14 is heat-insulated by means of an insulation 15. Insulation 15 can comprise, for example, glass fibre mats. The cover 13 is also provided with heat insulation 15'. The container 14 has a waste gas inlet 17 and a waste gas outlet 19. The waste gas enters the container 14 at a relatively high temperature, e.g. 150° C., and leaves at a relatively low termperature, e.g. 35° C.

A motor 21 having a drive shaft 23 is mounted on the lid 13. By means of the drive shaft 23 the motor 21 drives both a ventilator, such as fan 25, and a pump 27. The fan 25 is preferably a radial fan and, in one embodiment, is a radial ventilator of the type used in oil burners. Fan 25 is closed at the top and open at the bottom and further comprises a plurality of blades 35. As seen hereinafter the fan 25 functions both to feed the waste gas through the device 10 and to recirculate at least part of the waste gas in a spray chamber 29. Further, the fan 25 also serves to spray water and thereby provide a fine water mist in the spray chamber 29. For this purpose the pump 27 feeds water through a life tube 33 to the fan 25.

The water hitting the blades 35 of the fan 25 is finely atomized and forms a fine spray rain or mist in the spray chamber 29. The pump 27 has its propeller 37 located in the lower part of the container 14 to pump water through the lift tube 33 to the fan 25.

The fan 25 is preferably enclosed by a tubular guide 39. Guide 39 is located somewhat eccentrically to obtain a relatively high feed pressure. The tubular guide 39 has a plurality of openings 41 through which water droplets can fly. A flue duct 43 extends from the waste gas inlet 17 to the proximity of the input of the fan 25.

A tubular valve 45 is provided proximate the input of fan 25. Valve 45 is moveable axially on a stationary tube 49 to increase or decrease the size of a recirculation opening 51. The axial movement takes place by a mechanism schematically indicated by a rod 47. If the opening 51 is increased, a larger part of the waste gas transported by the fan 25 is again fed to the input of the fan 25 and recirculated, whereby more time is allowed for the exchange of heat and for the stripping of noxious substances from the waste gas by the water droplets and water vapor.

At the lower end of the spray chamber 29 is at least one thin film device 53. In one embodiment the thin film device 53 comprises a stone layer. The sprayed water continuously wets the stone layer and percolates into the lower part of the container 14.

As seen in FIG. 1 the spray chamber 29 is laterally limited by a wall 55. However, instead of the wall 55 in another embodiment there is provided a stone layer which is sandwiched between two perforated metal sheets.

Between the wall 55 of the spray chamber 29 and the inner wall of the container 14 is an intermediate space 57 through which the waste gas can flow before leaving the container through the exit 19. The heat exchanger 11, fashioned in a helical configuration, extends into this intermediate space 57. The cold water from the heating system preferably enters the heat exchanger 11 at 59. The other end 61 of the tube 11 is located at the bottom of the container 14 and leads to the inlet of the unillustrated boiler of the heating system. The waste gases are already relatively cool when they enter the intermediate space 57 and are further cooled by the cold backflow water. This causes the water in the waste gases to be condensed at the heat exchanger 11.

Because the water obtained by the combustion of carbon hydrates is condensed in the device 10, the liquid level in the container increases during operation. Accordingly, from time to time water must be drained from the container 14. For this purpose a magnet valve 63 is provided. The magnet valve 36 is, in one embodiment, controlled by a liquid level sensor 65. Thus, after the water reaches a predetermined level, sensor 65 opens the valve 63 and causes drainage of the excess water, e.g. into a sewer line.

A metering device with a magnet valve 67 permits the addition of a predetermined amount of neutralizing agent, e.g. milk of lime, into the water. The magnet valve 67 is operated from time to time to add neutralizing agent into the water. This operation can, for example, be initiated by the liquid level sensor 65. This control is perferable inasmuch as the amount of condensed water generated depends on the amount of fuel burnt. The amount of fuel burnt is, in turn, determinate of the amount of noxious gases. The magnet valve 76 is alternatively controllable by a signal from a pH-sensor 69. Reference numeral 71 designates a safety thermostat. The safety thermostat 71 acts to shut off the burner when the temperature is exceeding a certain limit.

Figure 2:
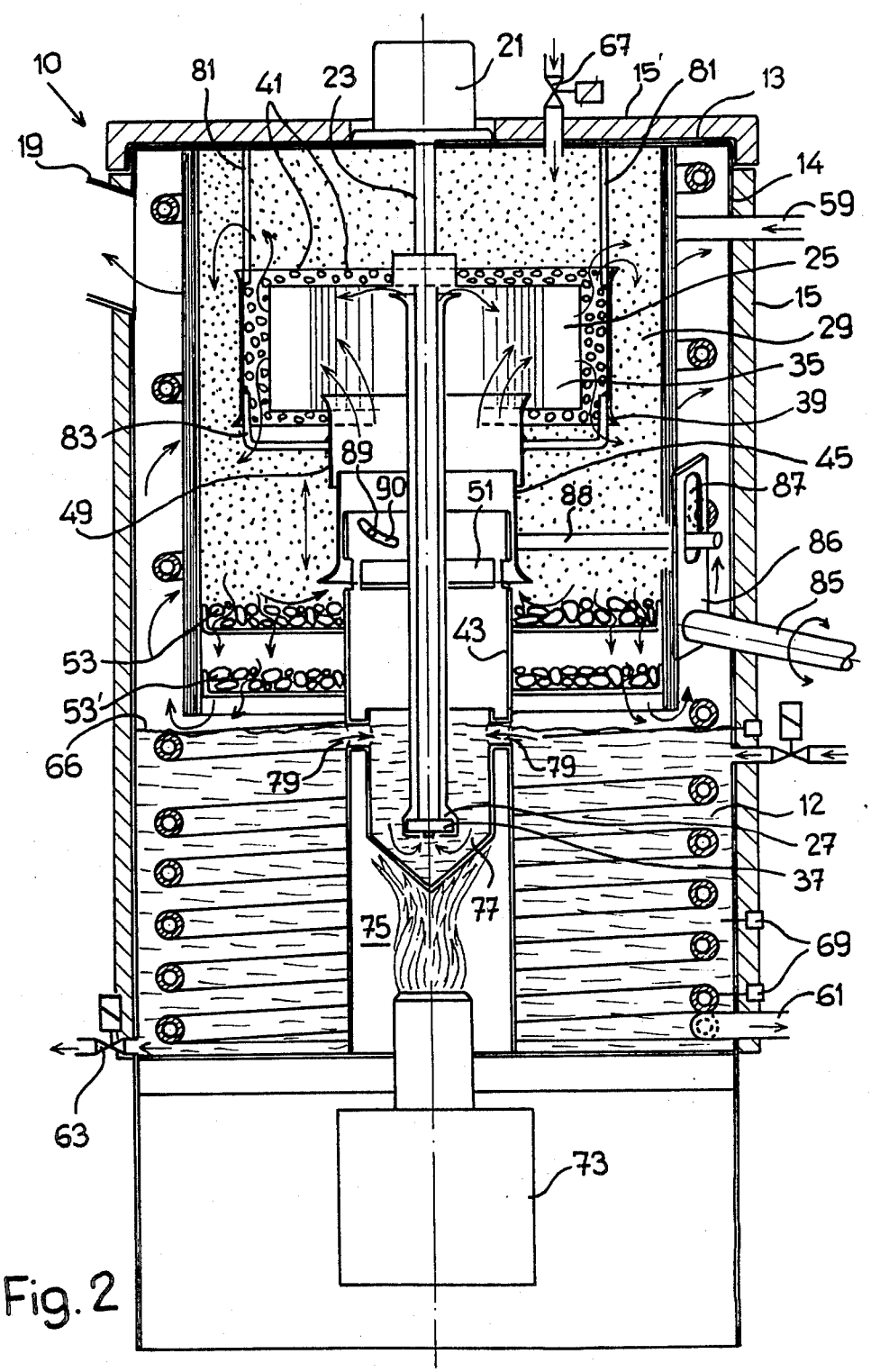
FIG. 2 is a cross-sectional view showing a cleaning device according to a second embodiment of the invention wherein the device is included with a boiler; and, FIG. 3 is a cross-sectional view showing a cleaning device according to a preferred embodiment of the invention.

The embodiment of the cleaning device shown in FIG. 2 basically differs from the embodiment shown in FIG. 1 in that, instead of a waste gas inlet, a burner 73 is provided. Accordingly, in the embodiment of FIG. 2 the device 10 is not just an addition to a boiler but includes the function of a boiler with integrated waste gas cleaning. Since the embodiment of FIG. 2 differs very little from the embodiment of FIG. 1, unless otherwise indicated the same reference numerals are used to describe similar elements. In this regard, the foregoing description of the embodiment of FIG. 1 can be referenced in connection with the embodiment of FIG. 2.

The burner 73 of the embodiment of FIG. 2 is located vertically and coaxially in the device 10. However, it is obvious to the man skilled in the art that a horizontal arrangement of the burner is possible in other embodiments. In fact, with certain design changes the whole device is arrangeable horizontally. However, a vertical arrangement is preferred.

A burner chamber 75 may be provided for the burner 73. The burner chamber 75 is preferably surrounded by water 12 in the container 14. Accordingly, a part of the heat generated by the burner will be directly transferred to the water in the lower part of the container 14. A water reservoir 77 for the pump 27 is in the burner chamber 75. This water reservoir 77 communicates with the container 14 by tubular connections 79. The burner chamber 75 is connected to the flue duct 43.

As indicated before, the embodiment of FIG. 2 operates in basically the same way as the embodiment of FIG. 1. It is apparent, therefore, that if the burner 73 were omitted, the burner chamber 75 could serve as a waste gas inlet in the same way as the part 17 in FIG. 1.

A few other remarks concerning the FIG. 2 embodiment are here provided. The tubular guide 37 is mounted by means of rods 81 at the lid 13. The stationary tube 49 is connected with the support rods 83 to the tubular guide 39. The tubular part 45 can slide on the flue duct 43 to open or close the recirculation openings 51 in the flue duct 43. To cause axial movement of the part 45 it is sufficient to rotate the rod 85. Rotation of rod 85 causes a movement of the member 86 having a slot 87 into which a rod 88 extends. As rod 88 is moved, the part 45 is rotated. A pin 89 is located on the part 45 and extends into a slanted slot 90 of the flue duct 43, whereby movement of the rod 88 causes an axial movement of the part 45.

For increased cleaning action two thin film devices 53,53' are provided in connection with the embodiment of FIG. 2. It is evident to the man skilled in the art that either relatively thick layers of stones or a plurality of stone layers may be provided, since the fan 25 causes a sufficient pressure to overcome the flow resistance caused by such thin film devices 53,53'. The burner 73 is preferably an oil gasification burner, because gasification burners furnish waste gases which are practically free of soot and carbon hydrates.

Figure 3:
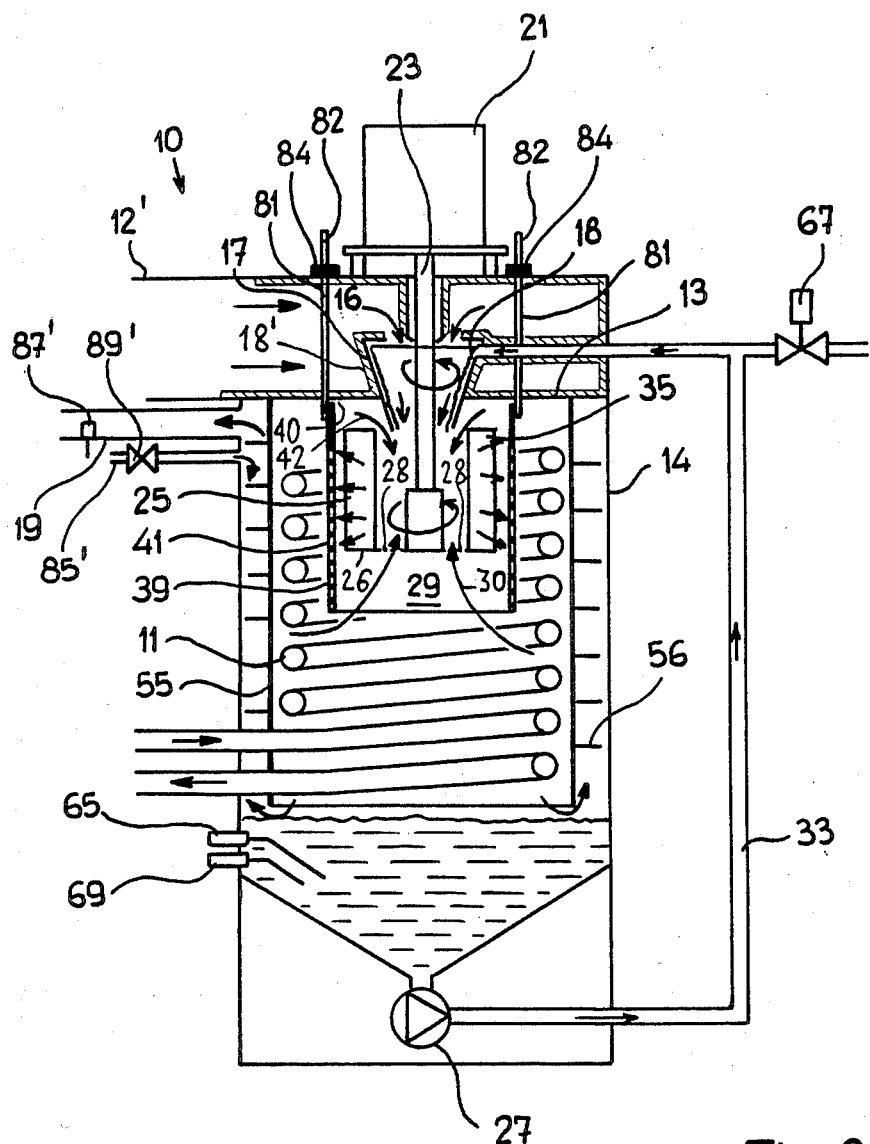

A preferred embodiment of the invention is shown in FIG. 3. This embodiment provides a substantial simplification with respect to the embodiment of FIG. 1. Again, unless otherwise noted, elements shown in FIG. 3 which are similar to those described in other embodiments are indicated by the same reference numerals.

The device 10 of the embodiment FIG. 3 comprises a container 14 closed by a lid 13. Container 14 and lid 13 are preferably heat insulated. Located in the container 14 is the heat exchanger 11 in the form of a tubular coil. Reference numeral 17 designates the waste gas inlet. The waste gas from a boiler flows through the duct 12 into the chamber 16 and from there into the waste gas inlet 17 having the form of a funnel. After flowing through the container 14, the waste gas exits through the waste gas outlet 19.

An electric motor 21 is located above the chamber 16. The motor 21 drives the fan 25 by means of the drive shaft 23. As in the other embodiments. described herein, the fan 25 is a radial fan. In the embodiment of FIG. 3 the radial fan is open at the top and also has openings 26 in a bottom disk 28 thereof. The fan 25 is enclosed by a tubular guide 39 having a plurality of openings 41.

The fan 25 has multiple functions. The fan feeds waste gases through the device; provides a recirculation of the waste gases in the spray chamber 29; and, acts as means for generating a fine spray or spray mist. For generating a spray the pump 27 pumps water through a tube 33 to the flush means 18 of the waste gas inlet 17. This waste gas inlet 17 is formed at least in part by a funnel located practically coaxially to the fan 25 and having a tangential water inlet 18 for flushing the funnel. The outer surface of the funnel is provided with thermal insulation 17'.

In the operation of the device of the embodiment of FIG. 3, the inner surface of the funnel 17 is covered by a water layer from flash means 18 which prevents direct contact of the waste gases with the inner surface of the funnel 17 advantageously no deposits can form by cystallization of material dissolved in the water on the funnel 17. This design of the waste gas inlet substantially contributes to the reliable operation of the device.

The water flowing downwardly in the funnel 17 hits the blades 35 of the fan 25 and is atomized to form a fine spray rain or mist in the spray chamber 29. The water droplets accelerated by the fan 25 hit the tubular guide 39, thereby causing a further atomization. Because there is a strong gas current through the openings 41, the water film occuring on the tubular guide 39 is disrupted at the edges of the openings which contributes to the formation of water mist within the container 14.

The tubular guide 39 is suspended on rods 81. The rods 81 have at their tops a thead 82 into which nuts 84 are threaded. By rotating the nuts the tubular guide 39 can be moved axially with respect to the fan 25. This permits an adjustment of the degree of recirculation of the gases in the container 14.

As in the previously described embodiments, a liquid level sensor 65 and a pH-sensor 69 are provided. For metered adding of a neutralizing agent the magnet valve 67 is also provided. With respect to the function of these elements reference may be had to the description of the embodiment of FIG. 1.

It should be noted with respect to the embodiment of FIG. 3 that the heat exchanger 11 is located within the space defined by the wall 55. At the outside of the wall 55 is a helical rib 56. Helical rib 56 provides a helical duct for the waste gases and a particularly good heat exchanger so that the waste gases exit from the waste gas outlet with a low temperature. Instead of a rib 56 other means can be provided to increase the path for the waste gases. For example, a plurality of protrusions on the outside of the wall 55 can be provided. However, the helical rib 56 has the particular advantage that it can serve to guide fresh water in a helical path for cooling of the wall 55 and the waste gases flowing in opposite direction along the helical path. Fresh water may be fed through the fresh water inlet 85 in case of an operation of a temperature switch 87, in which case a valve 89 is automatically opened.

While the invention has been particularly shown and described with reference to preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A device for heating a fluid and for cleaning a waste gas resulting from combustion, said device comprising:
   a container having a waste gas inlet through which gas is introduced into said container;
   spraying means for spraying liquid into said waste gas introduced into said container;
   heat exchanger means disposed in said container for transferring heat between said waste gas introduced into said container and a fluid-to-be-heated, said fluid-to-be-heated being kept out of direct contact with the liquid sprayed into said waste gas;
   moving means for moving waste gas through said container and recirculating means for recirculating waste gas through said container wherein said moving means and said recirculating means comprise a single fan means which also serves as said spraying means.

2. The device of claim 1 wherein said fan means is surrounded by a tubular guide and wherein said tubular guide has a plurality of openings.

3. The device of claim 1 wherein said fan means is surrounded by a tubular guide that is axially movable with respect to said fan.

4. A device for heating a fluid and for cleaning a waste gas resulting from combustion, said device comprising:
   a container having a waste gas inlet through which gas is introduced into said container;
   spraying means for spraying liquid into said waste gas introduced into said container;
   heat exchanger means disposed in said container for transferring heat between said waste gas introduced into said container and a fluid-to-be-heated, said fluid-to-be-heated being kept out of direct contact with the liquid sprayed into said waste gas;
   moving means for moving waste gas through said container and recirculating means for recirculating waste gas through said container, wherein said moving means and said recirculation means comprises a single fan having an inlet therefor; and,
   wherein said recirculation means comprises valve means for controlling the amount of waste gas recirculatable from said container to said fan inlet.

5. A device for heating a fluid and for cleaning a waste gas resulting from combustion, said device comprising:
   a container having a waste gas inlet through which gas is introduced into said container;
   spraying means for spraying liquid into said waste gas introduced into said container;
   heat exchanger means disposed in said container for transferring heat between said waste gas introduced into said container and a fluid-to-be-heated, said fluid-to-be-heated being kept out of direct contact with the liquid sprayed into said waste gas;
   fan means located below said waste gas inlet for moving waste gas through said container and recirculating waste gas through said container; and,
   means for covering at least a portion of said waste gas inlet with a liquid layer.

6. A device for heating a fluid and for cleaning a waste gas resulting from combustion, said device comprising:
   a container having a waste gas inlet through which gas is introduced into said container;
   spraying means for spraying liquid into said waste gas introduced into said container;
   heat exchanger means disposed in said container for transferring heat between said waste gas introduced into said container and a fluid-to-be-heated, said fluid-to-be-heated being kept out of direct contact with the liquid sprayed into said waste gas;
   fan means for moving waste gas through said container and recirculating waste gas through said container;
   covering means for covering at least a portion of said waste gas inlet with a liquid layer; and,
   wherein said waste gas inlet comprises a funnel located essentially coaxially with said fan, said funnel having a tangential liquid inlet comprising said covering means.

7. A device for heating a fluid and for cleaning a waste gas resulting from combustion, said device comprising:
- a container having a waste gas inlet through which gas is introduced into said container;
- spraying means for spraying liquid into said waste gas introduced into said container;
- heat exchanger means disposed in said container for transferring heat between said waste gas introduced into said container and a fluid-to-be-heated, said fluid-to-be-heated being kept out of direct contact with the liquid sprayed into said waste gas;
- moving means for moving waste gas through said container and recirculating means for recirculating waste gas through said container, wherein said moving means and said recirculation means comprise a single fan located in a spray chamber which is at least partially enclosd by a thin film means.

8. The device of claim 7, wherein said spray chamber is defined at the bottom by the thin film device; and,
- wherein, between the wall of said spray chamber and an inner wall of said container there is an intermediate space through which the waste gas can flow prior to leaving said container.

9. A device for heating a fluid and for cleaning a waste gas resulting from combustion, said device comprising:
- a container having a waste gas inlet through which gas is introduced into said container and a lower part thereof serving as a liquid reservoir;
- spraying means for spraying liquid into said waste gas introduced into said container;
- heat exchanger means disposed in said container for transferring heat between said waste gas introduced into said container and a fluid-to-be-heated, said fluid-to-be-heated being kept out of direct contact with the liquid sprayed into said waste gas;
- moving means for moving waste gas through said container and recirculating means for recirculating waste gas through said container;
- pH sensor means positioned in said container; and,
- metering means responsively connected to said sensor means for feeding a neutralizing agent into said container when a predetermined pH value is sensed.

10. A device for heating a fluid and for cleaning a waste gas resulting from combustion, said device comprising:
- a container having a waste gas inlet through which gas is introduced into said container;
- spraying means for spraying liquid into said waste gas introduced into said container;
- heat exchanger means disposed in said container for transferring heat between said waste gas introduced into said container and a fluid-to-be-heated, said fluid-to-be-heated being kept out of direct contact with the liquid sprayed into said waste gas;
- moving means for moving waste gas through said container and recirculating means for recirculating waste gas through said container; and,
- a spray chamber in said container, said spray chamber being limited by a wall having a helical rib thereon.

11. The device of claim 10, wherein an input for fresh liquid to said container is located in the upper part of the helical rib and a valve for the fresh liquid is operable by a temperature switch when the waste gas temperature exceeds a predetermined value.

* * * * *